United States Patent Office 2,872,299
Patented Feb. 3, 1959

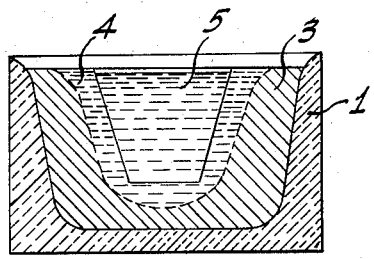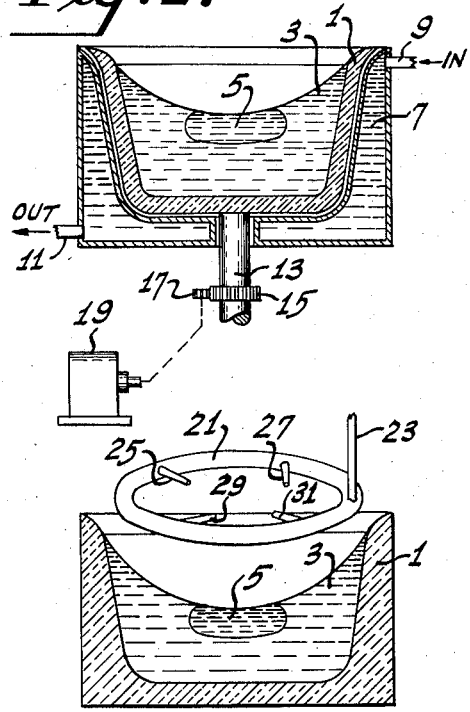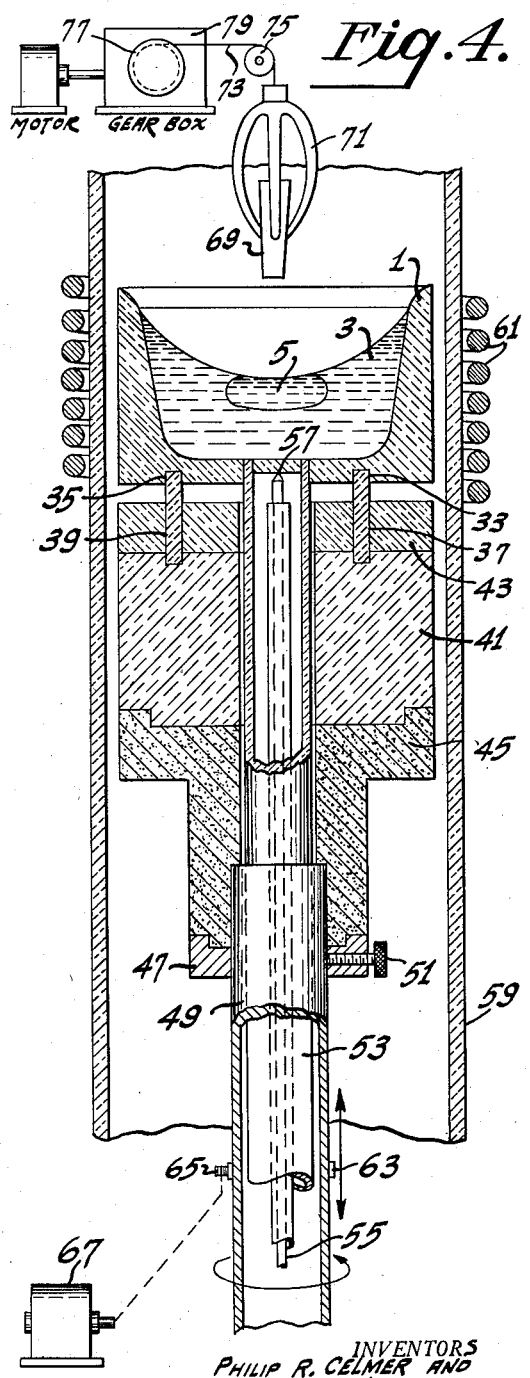

2,872,299

PREPARATION OF REACTIVE MATERIALS IN A MOLTEN NON-REACTIVE LINED CRUCIBLE

Philip R. Celmer and Robert V. Jensen, Trenton, N. J., assignors to Radio Corporation of America, a corporation of Delaware Application November 30, 1954, Serial No. 472,054

The terminal fifteen years of the term of the patent to be granted has been disclaimed 5 Claims. (Cl. 23—301)

This invention relates to the preparation of highly pure materials which are highly reactive in their molten phase. More particularly the invention relates to improved methods and apparatus for melting materials which tend to react with the containing vessel and thereby become contaminated.

Most materials can be melted without substantial contamination if the melting vessel is selected properly. Crucibles of graphite, carbon, or silica are sufficiently inert to be suitable for containing most materials in molten form. Germanium, for example, can be melted in a crucible of silica without fear of a contaminating reaction. Some materials, however, are so highly reactive in their molten phase that they react even with such comparatively inert materials as carbon and silica. Silicon is an example of such a material; others are titanium, tantalum, zirconium, and gallium arsenide as well as many oxides. The most important of these for making semi-conductor devices such as transistors, photocells and rectifiers is silicon. The successful operation of such semi-conductor devices depends in part upon utilization of semi-conductor material having very small, accurately controlled, amounts of certain impurities present. Hence contamination of the melt cannot be tolerated.

Generally in processing silicon for use in such devices it must be melted at least twice. The first step comprises zone melting wherein the silicon is purified by passing a melting zone of heat along its length. The second step occurs when the silicon is being grown in single crystal form from a melt of the purified material. Contamination by reaction with the containing crucible in either instance of course renders the silicon useless for its intended function. It has been found that even the purest quartz crucibles contain sufficient amounts of such impurities as boron to contaminate the silicon.

It is, therefore, an object of this invention to provide an improved means for holding a relatively high melting point material which is highly reactive during its molten phase.

An additional object of this invention is to provide an improved non-reactive, non-restrictive container for melting a relatively high melting point material such as silicon which is highly reactive in the motlen phase.

A further object of the invention is to provide an improved crucible into which a high melting point material such as silicon can be cast for cooling and solidification, part of the crucible being of a material having a higher melting point than that of silicon while the part of the crucible coming into contact with silicon has a lower melting point than the silicon.

These and other objects and advantages of the invention are accomplished by providing a high melting point crucible with a thick lining of some material which is non-reactive with and denser than the material to be melted. For melting silicon, such a lining may comprise strontium or barium chloride. The lining material should have a melting point lower than and a boiling point higher than the melting point of silicon. The liner can become molten either by contact with the molten material as in casting, or by being heated when the reactive material is being melted as in crystal-growing. Small amounts of the molten material are supported by surface tension upon the molten liner and out of contact with the solid crucible walls. Larger amounts of the molten material can be kept at the center of the more dense molten surround by rotating the crucible, centrifugal force keeping the less dense molten material at the center of the surround and out of contact with the crucible walls. Thus silicon, for example, is melted or cast in a non-reactive container and contamination of the highly reactive material and crucible damage are avoided. Should any portion of the $SrCl_2$ or $BaCl_2$ surround remain attached to the solidified silicon, it can readily be removed by dissolving it in water.

The invention will be described in greater detail in connection with the drawings thereof in which:

Figure 1 is a cross-sectional view of a crucible having a molten surround supporting a second molten material by surface tension;

Figure 2 is a cross-sectional view of a crucible having means to cool its outer portions while providing rotation thereof;

Figure 3 is a cross-sectional view of a crucible having air jet means to rotate the molten mass within said crucible; and Figure 4 is a partial cross-sectional elevational view of a vertical crystal-growing furnace having means to rotate the crucible thereof.

Throughout the drawings similar reference characters designate the same or similar elements.

According to the invention molten silicon, for example, can be maintained molten or permitted to solidify in a crucible such as shown in Figure 1. In this figure, the crucible 1, which may be of carbon, contains a non-reactive molten liner or surround 3, which, in turn, is shown supporting a mass 5 of molten silicon. The molten liner 3 may be of any material which is non-reactive both with silicon and with the material of the crucible. The density of the liner 3 should be greater than the density of silicon in order to support the molten mass 5 of silicon and for reasons to be later explained. It should be appreciated that small amounts of silicon can be supported by the surface tension of the molten liner 3; larger amounts of silicon of course could not be so supported. It is also desirable that the melting point of the liner material should be lower than the melting point of silicon in order to provide a non-restrictive surround for the silicon as it solidifies and expands. The boiling point of the liner material should, of course, be higher than the melting point of silicon so that the liner is not rapidly vaporized when the apparatus is in use. An example of such liner material suitable for use with a silicon melt is strontium chloride.

Molten silicon which has been purified by some means such as zone-melting can be cast in the crucible of Figure 1 and permitted to cool and solidify without fear of further contaminating the silicon. This is of particular advantage in reducing losses in crucibles due to cracks and breaks which develop during the cooling due to expansion of the solidifying silicon. The molten silicon is poured into the crucible 1 which has a solid inner liner 3 of strontium chloride. The molten silicon immediately melts those portions 4 of the liner 3 with which it comes into contact to a depth depending upon the temperature and the quantity of the molten silicon. It should be appreciated that the liner 3 can be made thick enough so that no matter how much molten silicon is to be contained therein, not all of the liner will be melted. The molten silicon is thus supported by a molten, non-restrictive crucible which, due to its lower melting point, will remain in the molten phase until after the silicon has solidified. The continuing molten phase of the liner has two advantages: First, as the silicon cools and expands, it literally floats in the molten liner 3 and is not restricted, hence the solid portion of the liner 3 and crucible 1 are not subjected to any forces or strains. Secondly, the solidified silicon mass 5 can be readily removed from the crucible 1 since it is in immediate contact only with the molten liner 3. After its removal from the crucible 1, the silicon mass 5 can be separated from any of the material which might still be adhering thereto by either the application of heat so as to melt the liner material or in the case of soluble liner materials by dipping the mass 5 into water whereupon the adhering liner material will be dissolved.

The apparatus shown in Figure 2 provides means for controlling the degree of melting of the inner liner 3 and for keeping the silicon mass 5 out of contact with the walls of the crucible 1 when the mass of the silicon is too great to be supported by surface tension. The hollow vessel 7, internally shaped so as to conform to the outside shape of the crucible 1, is provided with an inlet 9 and an outlet 11 so as to permit the flow of a coolant fluid through the vessel. The use of a cool surround for the crucible 1 insures the constant solid state of the outermost portions of the molten liner 3 and reduces the necessity of an excessively thick liner. This in turn helps to prevent the melting of all the liner 3 so as to expose any of the crucible wall for possible contact and contamination with the silicon mass 5.

The crucible 1 is supported upon a shaft 13 within the vessel 7. By means of the gears 15 and 17, and the motor 19, the crucible can be rotated. The molten materials within the crucible obeying the laws of motion, will be urged outwardly against the walls of the crucible depending upon their mass, the more dense material being affected by centrifugal force to the greatest extent. Thus the more dense molten liner 3 will be constantly the outermost fluid, while the less dense silicon mass 5 will be contained within the molten surround 3 in a region closer to the center of rotation thereof. Thus by rotation of the crucible and its contents the materials therewithin are separated by centrifugal force according to their densities with the result that the less dense silicon mass 5 will always be separated from the crucible by the denser non-reactive surround 3.

Figure 3 illustrates another embodiment of the invention wherein alternative means are provided for rotating the materials within the crucible 1 without rotating the crucible itself. In this embodiment the molten surround 3 and the molten silicon mass 5 are caused to rotate within the crucible by directing a jet or jets of gas against the materials. The jets may be provided by a tubular ring 21 which is connected by the pipe 23 to a source of compressed inert or non-reactive gas (not shown). The ring 21 is provided with a series of laterally and downwardly extending nozzles 25, 27, 29, and 31 so located around the ring 21 as to provide a whirling stream of gas therefrom. The downward direction of the nozzles 25, 27, 29, and 31 and the gas streams issuing therefrom should be such that the streams of gas can strike the molten materials within the crucible 1 and produce rotation thereof while the ring 21 itself is out of contact with the materials in the crucible. It should be noted that the use of streams of gas to produce rotation also achieves some cooling of the outermost portions of the molten surround 3. It is also possible to cool the crucible 1 in the same manner as described in connection with Figure 2.

In the embodiments of the invention shown in Figures 2 and 3 wherein the molten materials within the crucible 1 are to be rotated, the walls of the crucible should be high enough to prevent the moving molten materials from leaving the crucible. Also a sufficient quantity of the surround 3 should be provided so that when forced against the walls of the crucible 1 a sufficient depth of the surround 3 remains in the center of the crucible 1 so as to provide adequate isolation of the silicon mass 5 from the bottom of the crucible.

Figure 4 illustrates a furnace for growing single crystals by the Kyropoulis-Czochralski technique with which the invention may be used to advantage. The crucible 1 may be of the same shape and general character as the crucibles shown and described in Figures 1, 2, and 3 with the slight exception that recesses 33 and 35 are provided in the bottom exterior of the crucible 1 for receiving the Alundum pins 37 and 39 respectively which rigidly support the crucible upon the magnesia insulating block 41. In order to insulate the magnesia block 41 from the heat of the crucible 1, an Alundum washer 43 is placed between the crucible and the magnesia. The magnesia block is supported by a carbon cylinder 45 which rests upon a stainless steel ring 47 which in turn is secured to a stainless steel tube 49 by a set screw 51. A refractory tube 53 extends from within the carbon crucible 1 downward through the insulating members, the carbon cylinder 45, and the steel tube 49 to provide a passageway for the leads 55 of a thermocouple 57.

The steel tube 49, which supports the crucible and insulating assembly, is supported by any convenient means (not shown). The assembly is enclosed within a refractory tube 59 which may be of quartz. An electrical induction heating coil 61 surrounds the tube 59 and is provided with an alternating electric current from any convenient power source (not shown). The crucible 1 and the insulating assembly may be rotated by means of the gear 63 attached to the steel tube 49, the gear 65, and the motor 67.

The crucible 1 is provided with a non-reactive liner 3 which may be strontium chloride ($SrCl_2$). Strontium chloride, having a melting point of 848° C. will thus become molten at a lower temperature than the silicon mass 5 which may be added in the form of a powder after the surround 3 has become molten. To add the silicon before the molten phase of the surround 5 is reached, considerably adds to the risk of bringing the silicon into contact with the walls of the carbon crucible 1 and becoming contaminated thereby. Hence, according to the invention, it is preferred not to add any silicon until the surround 3 has become completely molten. Of course by the time the melting temperature of silicon (1420° C.) is reached, the $SrCl_2$ should be melted. In addition to waiting until the surround 3 is completely molten before adding the silicon to be melted, the crucible 1 should be rotated at a speed fast enough to produce a centrifugal force which will force the lighter density silicon toward the center of the crucible 1. Since the density of $SrCl_2$ is 3.05 g./cm.³ compared to 2.42 g./cm.³ the density of silicon, the silicon as it is added to the crucible 1 not only melts but, because it is center-seeking, is also surrounded by the non-reactive $SrCl_2$ and prevented from contacting and reacting with the crucible 1, itself. Thus once in the molten phase the silicon mass 5 will be isolated at the center of the molten surround 3. In order to pull a single crystal of silicon from the molten mass 5 a seed crystal 69, held by any suitable means such as the tungsten spider 71, is contacted to the surface of the molten silicon mass 5. The temperature of the melt is reduced almost to the freezing point of silicon (1450° C.) by reducing the current supplied to the heating coil 61. The seed crystal 69 is then slowly withdrawn from the melt as a crystal grows attached thereto. Any convenient means such as the stainless steel cord 73 and the pulley 75 may be utilized to withdraw the crystal. The steel cord 73 may be wound upon a rotating drum 77 driven by a motor and a speed reducing assembly 79.

It is apparent that changes may be made in the apparatus shown and described without departing from the spirit of the invention. While the crystal growing apparatus of Figure 4 includes means for rotating the crucible 1 and is contents by a mechanical gear-drive assembly, it is to be appreciated that the contents of the crucible 1 could be rotated by means of inert gas jets as described in connection with Figure 3. Inasmuch as silicon crystals are usually grown in an inert gas atmosphere, rotating the melt within the crucible by gas streams directed angularly against the melt surface is of particular interest since it does permit the same object to be accomplished without employing additional equipment such as a gear, gear-drives, and motor. Likewise it is entirely feasible to provide for the cooling of the crucible 1 as described in connection with Figure 2 for the same purposes and advantages.

While the invention has been described with particular reference to the processing of silicon in the molten phase it is not to be so limited. Any material which is highly reactive in its molten state with the material of the container can be processed according to the invention by isolating it from the reactive container by means of a non-reactive molten surround. Many materials are difficult to process in the molten phase without reaction. Some of these, mentioned previously, are zirconium, titanium, tantalum, various metallic oxides, and gallium arsenide. Likewise while strontium chloride and other metallic halides have been mentioned in connection with the melting or casting of silicon, the invention is to be in no way limited to these materials. For any given material to be melted or contained while molten and reactive a non-reactive substance can be found whose melting and boiling points are lower and higher, respectively, and whose density is greater than that of the material to be isolated from the container. For silicon, most of the metallic halides have the requisite properties and are preferred according to the practice of the invention. The following is a list of materials suitable for acting as the non-reactive surround for the materials to be processed in the molten phase as indicated.

*Reactive materials with non-reactive surrounds listed thereunder*

| Silicon | Tantalum | Titanium | Zirconium |
| --- | --- | --- | --- |
| M. P. 1,420° C. sp. gr. 2.42 | M. P. 2,850° C. sp. gr. 16.6, 14.49 | M. P. 1,800° C. sp. gr. 4.5 | M. P. 2,130° C. sp. gr. 6.4 |
| $VF_2$: <br> M. P. (1,100° C.) <br> B. P. (2,200° C.) <br> sp. gr. 3.36 | | | |
| $CrF_2$: <br> M. P. 1,078° C. <br> B. P. 2,100° C. <br> sp. gr. 4.11 | | | |
| $SrCl_2$: <br> M. P. 848° C. <br> B. P. (2,000° C.) <br> sp. gr. 3.05 | | | |
| $BaF_2$: <br> M. P. 1,329° C. <br> B. P. 2,193° C. <br> sp. gr. 4.83 | | $BaF_2$: <br> M. P. 1,329° C. <br> B. P. 2,193° C. <br> sp. gr. 4.83 | |
| $BaCl_2$: <br> M. P. 936° C. <br> B. P. 1,803° C. <br> sp. gr. 3.856 | | | |
| $CaBr_2$: <br> M. P. 736° C. <br> B. P. 1,703° C. <br> sp. gr. 3.35 | | | |
| $SrBr_2$: <br> M. P. 629° C. <br> B. P. (1,805° C.) <br> sp. gr. 4.216 | | | |
| $MnF_2$: <br> M. P. 832° C. <br> B. P. (2,000° C.) <br> sp. gr. 3.98 | | | |
| $FeF_2$: <br> M. P. 1,078° C. <br> B. P. (1,800° C.) <br> sp. gr. 3.95-4.33 | | | |
| $CoF_2$: <br> M. P. 1,178° C. <br> B. P. (1,700° C.) <br> sp. gr. 4.46 | | | |
| $NiF_2$: <br> M. P. (1,000° C.) <br> B. P. (1,600° C.) <br> sp. gr. 4.63 | | | |
| $NaF$: <br> M. P. 971° C. <br> B. P. 1,680° C. <br> sp. gr. 2.79 | | | |
| $MgF_2$: <br> M. P. 1,239° C. <br> B. P. 2,203° C. <br> sp. gr. 2.9-3.2 | | | |
| $CaF_2$: <br> M. P. 1,394° C. <br> B. P. 2,480° C. <br> sp. gr. 3.18 | | | |
| $CaCl_2$: <br> M. P. 758° C. <br> B. P. (2,000° C.) <br> sp. gr. 2.512 | | | |
| $SrF_2$: <br> M. P. 1,376° C. <br> B. P. 2,450° C. <br> sp. gr. 4.24 | | | |
| $CdF_2$: <br> M. P. 1,086° C. <br> B. P. 1,727° C. <br> sp. gr. 6.64 | | | |

*Reactive materials with non-reactive surrounds listed thereunder*—Continued

| Silicon | Tantalum | Titanium | Zirconium |
|---|---|---|---|
| M. P. 1,420° C.<br>sp. gr. 2.42 | M. P. 2,850° C.<br>sp. gr. 16.6, 14.49 | M. P. 1,800° C.<br>sp. gr. 4.5 | M. P. 2,130° C.<br>sp. gr. 6.4 |
| Pb:<br>  M. P. 327° C.<br>  B. P. 1,525° C.<br>  sp. gr. 11.34 | | | |
| Sb$_2$O$_3$:<br>  M. P. 656° C.<br>  B. P. 1,550° C.<br>  sp. gr. ? | | | |
| Bi$_2$O$_3$:<br>  M. P. 820° C.<br>  B. P. 1,890° C.<br>  sp. gr. 8.868 | | Bi$_2$O$_3$:<br>  M. P. 820° C.<br>  B. P. 1,890° C.<br>  sp. gr. 8.868 | |
| FeO:<br>  M. P. 1,420° C.<br>  B. P. ?<br>  sp. gr. 5.7 | | FeO:<br>  M. P. 1,420° C.<br>  B. P. ?<br>  sp. gr. 5.7 | |
| BaBr$_2$:<br>  M. P. 823° C.<br>  B. P. (1,800° C.)<br>  sp. gr. 4.781 | | BaBr$_2$:<br>  M. P. 823° C.<br>  B. P. (1,800° C.)<br>  sp. gr. 4.781 | |
| BaI$_2$:<br>  M. P. 687° C.<br>  B. P. (1,700° C.)<br>  sp. gr. 5.15 | | | |
| CuCl:<br>  M. P. 406° C.<br>  B. P. 1,666° C.<br>  sp. gr. 3.53 | | | |
| | | Fe$_2$O$_3$:<br>  M. P. 1,565° C.<br>  B. P. ?<br>  sp. gr. 5.24 | |
| | | WO$_3$:<br>  M. P. 1,473° C.<br>  B. P. ?<br>  sp. gr. 7.16 | WO$_3$:<br>  M. P. 1,473° C.<br>  B. P. ?<br>  sp. gr. 7.16 |
| | WC:<br>  M. P. 2,777° C.<br>  B. P. 6,000° C.<br>  sp. gr. 15.7 | | |
| PbO:<br>  M. P. 888° C.<br>  B. P. ?<br>  sp. gr. 9.53 | | | |

In a few cases the boiling points of certain materials are not known or given in the chemical handbooks consulted. These have been indicated by a question mark in the above list and included when the boiling point is known to be at least higher than the melting points of the reactive materials concerned. Likewise PbO is not listed under titanium because it is felt that this compound becomes unstable at the high temperatures required therefor.

The practice of the invention is of advantage in the case where it is desired to grow near true equilibrium crystals. In order to grow near true equilibrium crystals it is necessary to maintain a very uniform temperature gradient around the crystallizing material and to allow the crystal to grow unrestricted by its container. The invention is admirably suited to accomplish these objects. One method of growing such a crystal, for example silicon, is to choose a non-reactive surround whose melting and boiling points are lower and higher respectively than the melting point of silicon, and whose density is just sufficient to float the silicon just below the surface of the melt. Examples of such non-reactive surrounds are calcium chloride (density 2.512), sodium fluoride (density 2.79), and strontium chloride (density 3.05). A seed crystal is then contacted to the molten material and the melt is very slowly cooled so that an equilibrium growth begins with the seed as a nucleus. Since the molten material is almost completely surrounded by the non-reactive surround, the surrounding temperature gradient will be almost completely uniform. The molten surround is also non-restrictive. It should also be evident that the practice of the invention with respect to growing near true equilibrium crystals is not to be restricted to the case where the material to be crystallized is reactive with its container when molten. Any material which is desired to be grown as a near true equilibrium crystal, whether reactive or not, can be so grown according to the invention with advantage.

What is claimed is:

1. In the Czochralski method of growing single crystals of silicon, the method of preventing reaction between silicon and crucible materials comprising the steps of: providing a graphite crucible to hold said silicon with an internal lining of a material non-reactive with said silicon and whose density is greater than the density of said silicon and whose melting point is lower and whose boiling point is higher than the melting point of said silicon, heating said crucible so that said lining becomes molten, rotating said crucible while feeding said silicon thereinto whereupon said silicon becomes molten, said molten lining being urged radially outwardly against the walls of said crucible by the rotation thereof so as to prevent said less dense molten silicon from contacting said crucible walls, contacting a seed crystal of silicon to said molten silicon, and slowly withdrawing said seed crystal so that said molten silicon attaches thereto and grows thereon in single crystal form.

2. In apparatus for growing single crystals of silicon by the Czochralski method, a graphite crucible, means to heat said crucible, means to supply an inert atmosphere to said crucible, a metallic halide lining for said crucible having a density greater than the density of silicon, the boiling and melting points of said metallic halide lining being higher and lower, respectively, than the melting point of silicon, means for rotating said crucible, and means for contacting a seed crystal of silicon to the surface of a molten substance contained within said crucible and for slowly withdrawing said seed crystal.

3. A method of growing a single crystal of silicon in a container which reacts with molten silicon comprising the steps of providing said container with a liner of a denser non-reactive metallic halide whose melting point is lower and whose boiling point is higher than the melting point of said silicon, heating said container so that said metallic halide liner becomes molten, rotating said molten liner while feeding said silicon into said container whereupon said silicon becomes molten, thereafter rotating both said molten liner and said molten silicon, said molten lining being urged radially outwardly against the walls of said container by said rotating so as to prevent said molten silicon from contacting said container, contacting a seed crystal of silicon to said molten silicon, and withdrawing said seed crystal so that said molten silicon adheres thereto and grows thereon in single crystal form.

4. A method of growing a single crystal of silicon in a container which reacts with molten silicon comprising the steps of providing said container with a liner of a denser non-reactive metallic halide whose melting point is lower and whose boiling point is higher than the melting point of said silicon, heating said container so that said metallic halide becomes molten, rotating said container while feeding said silcon thereinto whereupon said silicon becomes molten, said molten lining being urged radially outwardly against the walls of said container by the rotation thereof so as to prevent said molten silicon from contacting said container, contacting a seed crystal of silicon to said molten silicon, and withdrawing said seed crystal so that said molten silicon adheres thereto and grows thereon in single crystal form.

5. The method of growing a single crystal of silicon in a container which reacts with molten silicon comprising the steps of providing said container with a liner of a denser non-reactive metallic halide whose melting point is lower and whose boiling point is higher than the melting point of said silicon, heating said container so that said metallic halide liner becomes molten, directing a stream of gas against the surface of said molten liner to cause rotation thereof while feeding said silicon into said container whereupon said silicon becomes molten, continuing to direct said stream of gas against the surfaces of both said liner and said molten silicon to maintain rotation thereof and cause said molten liner to be continuously urged radially outwardly against the walls of said container to prevent said molten silicon from contacting said container, contacting a seed crystal of silicon to said molten silicon, and withdrawing said seed crystal so that said molten silicon adheres thereto and grows thereon in single crystal form.

References Cited in the file of this patent

UNITED STATES PATENTS

| | | |
|---|---|---|
| 1,831,310 | Lindemuth | Nov. 10, 1931 |
| 2,607,674 | Winter | Aug. 19, 1952 |
| 2,631,356 | Sparks et al. | Mar. 17, 1953 |
| 2,686,212 | Horn et al. | Aug. 10, 1954 |

OTHER REFERENCES

Mellor: "Comprehensive Treatise on Inorganic and Theoretical Chemistry," published by Longmans, Green and Co., New York, vol. 6, 1925, pages 162, 178 and 179.